(12) United States Patent
Shanmugam et al.

(10) Patent No.: US 11,062,052 B2
(45) Date of Patent: Jul. 13, 2021

(54) SYSTEM FOR PROVISIONING VALIDATED SANITIZED DATA FOR APPLICATION DEVELOPMENT

(71) Applicant: Bank of America Corporation, Charlotte, NC (US)

(72) Inventors: Parthiban T. Shanmugam, Charlotte, NC (US); Bhimeswar Rao Kharade Maratha, Charlotte, NC (US); Parthasarthy Rajarathinam, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 185 days.

(21) Appl. No.: 16/035,162

(22) Filed: Jul. 13, 2018

(65) Prior Publication Data

US 2020/0019729 A1 Jan. 16, 2020

(51) Int. Cl.
*G06F 21/00* (2013.01)
*G06F 21/62* (2013.01)
*G06F 9/54* (2006.01)
*G06F 16/25* (2019.01)
*G06F 16/9038* (2019.01)
*G06F 16/903* (2019.01)

(52) U.S. Cl.
CPC .......... *G06F 21/6254* (2013.01); *G06F 9/542* (2013.01); *G06F 16/258* (2019.01); *G06F 16/9038* (2019.01); *G06F 16/90335* (2019.01)

(58) Field of Classification Search
CPC .................................. G06F 21/00; G06F 16/00
See application file for complete search history.

(56) References Cited

U.S. PATENT DOCUMENTS

| | | | |
|---|---|---|---|
| 7,003,621 B2 | 2/2006 | Koren et al. | |
| 7,089,350 B2 | 8/2006 | Koren et al. | |
| 7,526,620 B1 | 4/2009 | McGovern | |
| 7,814,090 B2 | 10/2010 | Dhamija et al. | |
| 7,941,434 B2 * | 5/2011 | Kenedy | G16H 20/30 707/737 |
| 8,024,530 B2 | 9/2011 | Deetz et al. | |
| 8,051,033 B2 * | 11/2011 | Kenedy | G06F 16/24575 707/603 |
| 8,065,324 B2 * | 11/2011 | Kenedy | G16H 20/30 707/769 |
| 8,200,527 B1 * | 6/2012 | Thompson | G06Q 10/06398 705/7.39 |
| 8,234,462 B2 | 7/2012 | Deetz et al. | |

(Continued)

*Primary Examiner* — Farhan M Syed
(74) *Attorney, Agent, or Firm* — Michael A. Springs; Moore & Van Allen PLLC; Nicholas C. Russell

(57) ABSTRACT

Embodiments of the present invention provide a system for provisioning validated sanitized data for application development. The system is configured for establishing a communication link with a plurality of disparate systems, retrieving data from the plurality of disparate systems via the communication link, sanitizing the data retrieved from the plurality of disparate systems, generating a query to validate the sanitized data, wherein the generation of the query is based on a set of rules, validating the sanitized data using the query generated based on the set of rules, determining that the validation of the sanitized data is successful, and transmitting the validated sanitized data to a second plurality of disparate systems.

20 Claims, 5 Drawing Sheets

(56) References Cited

U.S. PATENT DOCUMENTS

| | | | |
|---|---|---|---|
| 8,442,982 B2 | 5/2013 | Jacobson et al. | |
| 8,458,121 B2* | 6/2013 | Kenedy | G06Q 40/08 |
| | | | 707/603 |
| 8,606,761 B2* | 12/2013 | Kenedy | G09B 19/00 |
| | | | 707/688 |
| 8,627,020 B2 | 1/2014 | Deetz et al. | |
| 8,655,899 B2* | 2/2014 | Kenedy | G06F 16/9535 |
| | | | 707/758 |
| 8,788,283 B2* | 7/2014 | Kenedy | G06N 7/005 |
| | | | 705/2 |
| 8,909,888 B2 | 12/2014 | Goss et al. | |
| 8,954,703 B2 | 2/2015 | Koren et al. | |
| 9,003,474 B1* | 4/2015 | Smith | G06F 21/606 |
| | | | 726/1 |
| 9,363,085 B2 | 6/2016 | Offenberg et al. | |
| 9,411,513 B2 | 8/2016 | Lin | |
| 9,471,232 B2 | 10/2016 | Koren et al. | |
| 9,716,594 B2 | 7/2017 | Offenberg et al. | |
| 9,830,089 B1 | 11/2017 | Statica et al. | |
| 10,140,043 B1 | 11/2018 | Leavy et al. | |
| 10,241,715 B2* | 3/2019 | Lesartre | G06F 3/0688 |
| 10,505,917 B2* | 12/2019 | Chhabra | H04L 63/20 |
| 2004/0022379 A1* | 2/2004 | Klos | H04Q 3/0029 |
| | | | 379/201.01 |
| 2004/0117358 A1* | 6/2004 | von Kaenel | G06Q 40/08 |
| 2004/0153343 A1* | 8/2004 | Gotlib | G06Q 10/10 |
| | | | 705/3 |
| 2005/0254300 A1 | 11/2005 | Koren et al. | |
| 2005/0270843 A1 | 12/2005 | Koren et al. | |
| 2007/0050340 A1* | 3/2007 | von Kaenel | G06F 21/604 |
| 2008/0181100 A1* | 7/2008 | Yang | H04L 41/0654 |
| | | | 370/216 |
| 2009/0158441 A1* | 6/2009 | Mohler | G06F 21/552 |
| | | | 726/27 |
| 2009/0240694 A1* | 9/2009 | Jensen | G06F 16/00 |
| 2011/0219035 A1* | 9/2011 | Korsunsky | G06F 21/00 |
| | | | 707/784 |
| 2014/0074889 A1* | 3/2014 | Neels | G06F 16/248 |
| | | | 707/779 |
| 2014/0129785 A1 | 5/2014 | Deetz et al. | |
| 2016/0205073 A1* | 7/2016 | Smith | H04L 63/0281 |
| | | | 726/12 |
| 2018/0165036 A1* | 6/2018 | Lesartre | G06F 3/0688 |
| 2018/0351941 A1* | 12/2018 | Chhabra | H04L 9/3234 |

* cited by examiner

SYSTEM FOR PROVISIONING VALIDATED SANITIZED DATA FOR APPLICATION DEVELOPMENT

BACKGROUND

Utilization of data extracted from production environments is a useful practice for assessing applications within a test environment due to the real-life nature of the data. However, data extracted from production environments often contain sensitive information that are not consistently or adequately sanitized or obfuscated before entering the test environment. Therefore, there exists a need for a system for providing validated sanitized data for application development.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing a holistic and secure resource provisioning gateway. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention establishes a communication link with a plurality of disparate systems, retrieves data from the plurality of disparate systems via the communication link, sanitizes the data retrieved from the plurality of disparate systems, generates a query to validate the sanitized data, wherein the generation of the query is based on a set of rules, and validates the sanitized data using the query generated based on the set of rules.

In some embodiments, the present invention determines that the validation of data is successful, in response to determining that the validation of sanitized data is successful, transmits the sanitized data to a second plurality of disparate systems, wherein the second plurality of disparate systems are non-production environment systems.

In some embodiments, the present invention determines that the validation of data is not successful, in response to determining that the validation of sanitized data is not successful, generates an alert and transmit control signals to display the alert via a graphical user interface on one or more user devices.

In some embodiments, the present invention in response to transmitting the control signals to display the alert, receives at least one remediation step from the one or more user devices, wherein the at least one remediation step is associated with the sanitized data, implements the at least one remediation step received from the one or more user devices, validates the sanitized data based on implementing the at least one remediation step, and transmits the sanitized data to a second plurality of disparate systems, wherein the second plurality of disparate systems are non-production environment systems.

In some embodiments, the present invention sanitizes the data by obfuscating at least one of Non-Public Information (NPI), confidential data, and private data from the data retrieved from the plurality of disparate systems.

In some embodiments, the present invention generates the query by identifying data types associated with one or more elements in the data, scanning the one or more elements in the data, determining type of information in the one or more elements based on scanning the one or more elements in the data and the identified data types, extracting the set of rules from a rules database, wherein the set of rules are associated with the identified data types and the type of information, and formulating the query based on the set of rules extracted from the rules database.

In some embodiments, the present invention validates the sanitized data using the query by determining that Non-Public Information (NPI), confidential data, and private data within the sanitized data is protected.

In some embodiments, the plurality of disparate systems comprise production environment systems.

In some embodiments, the second plurality of disparate systems comprise non-production environment systems.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
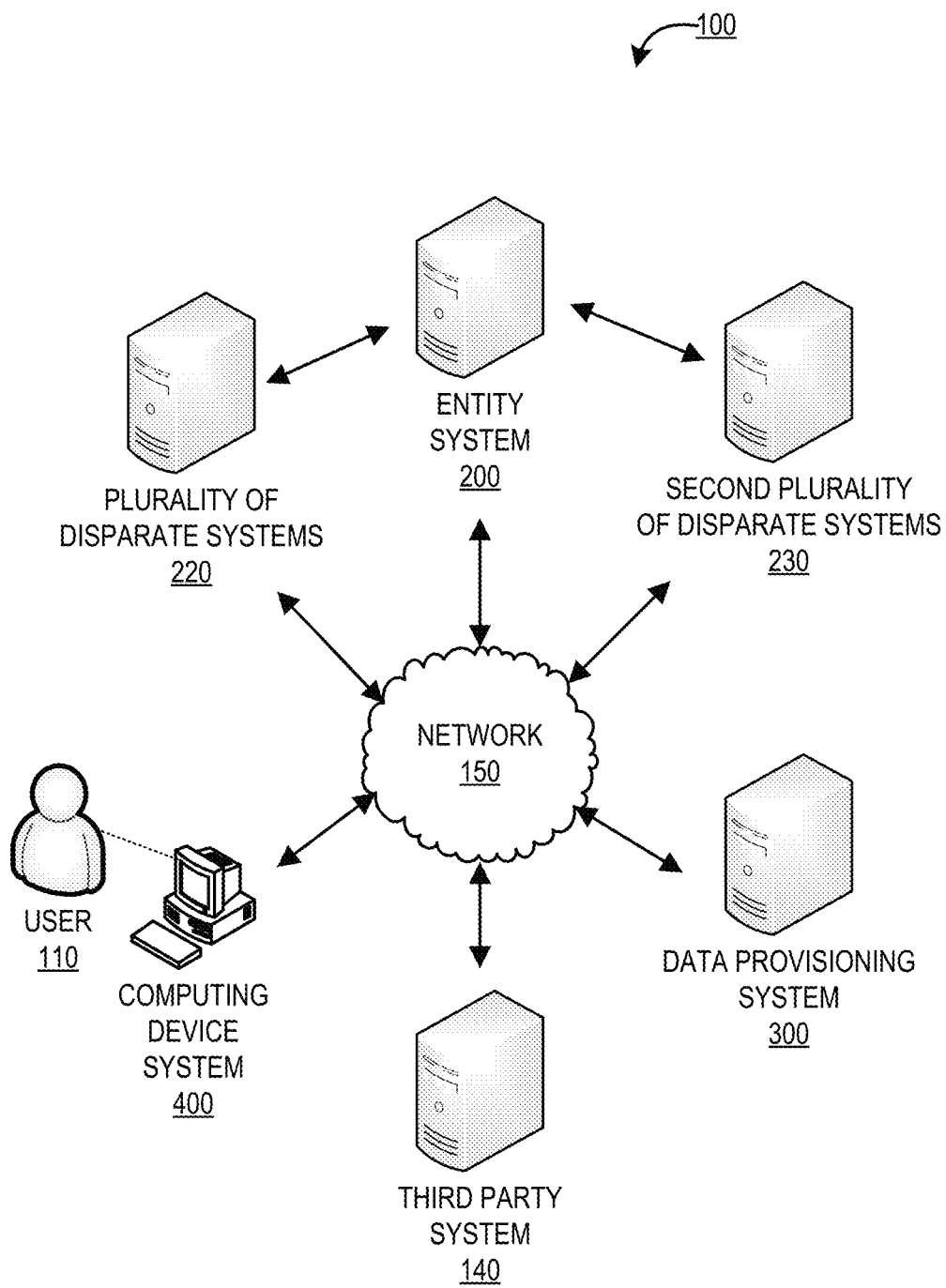
Figure 2:
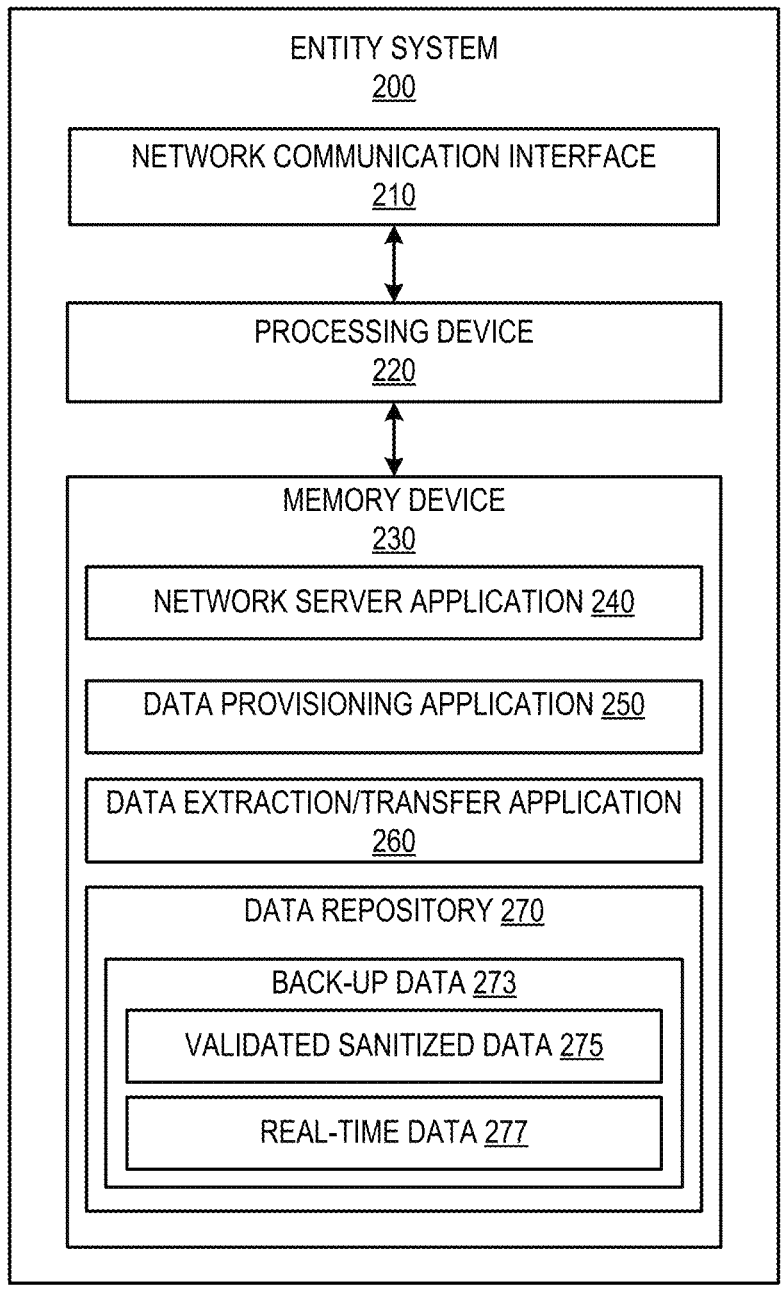
Figure 3:
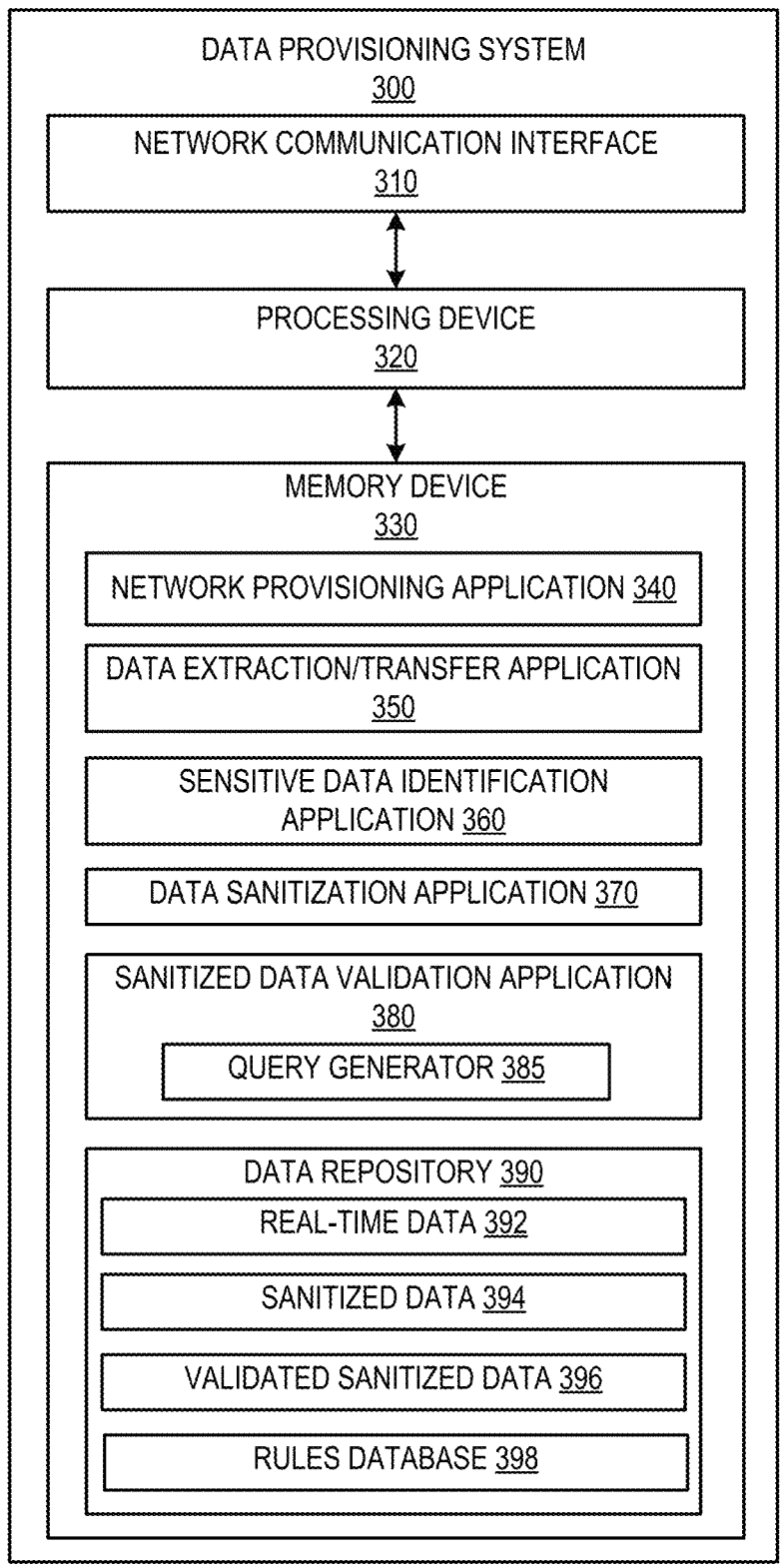
Figure 4:
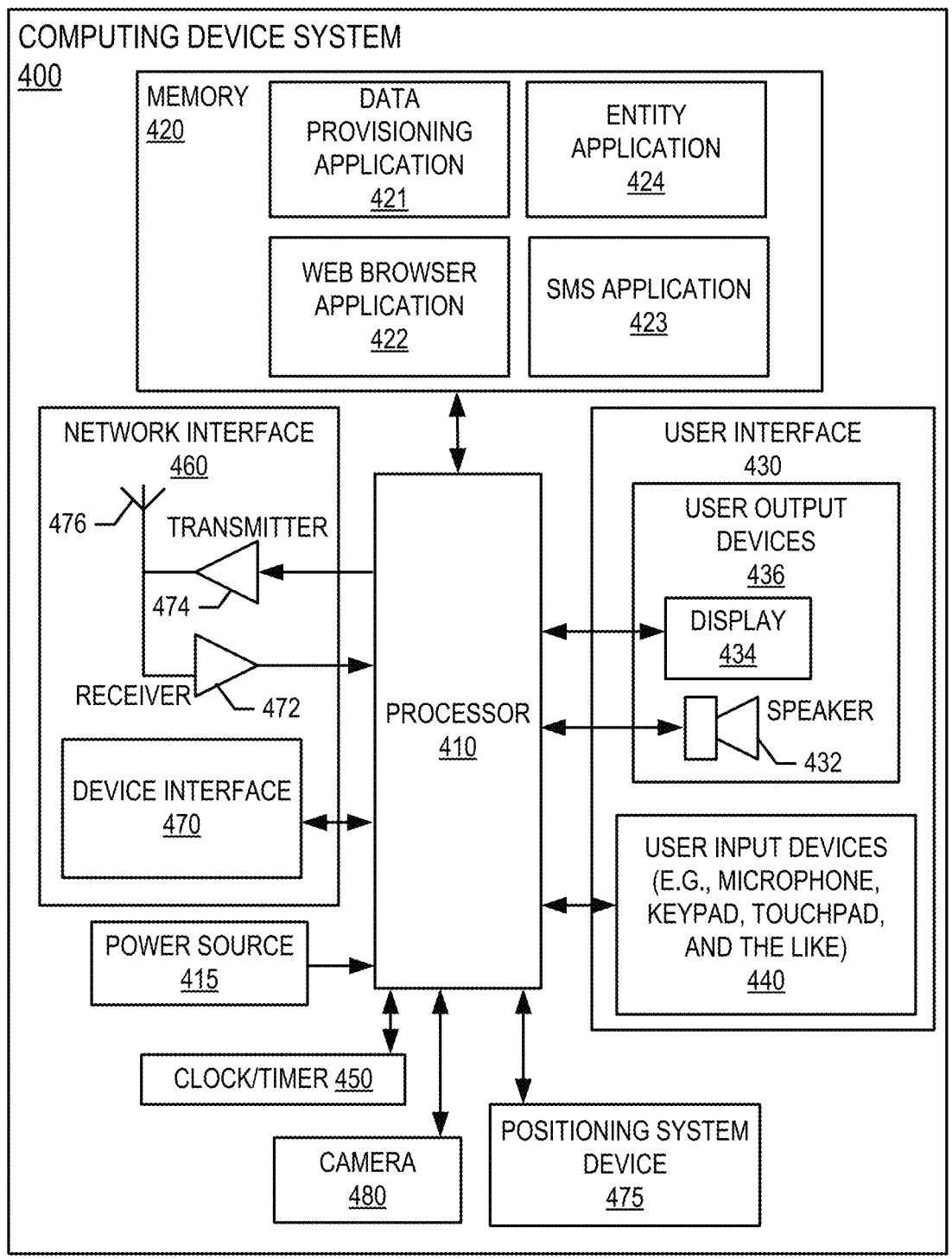
Figure 5:
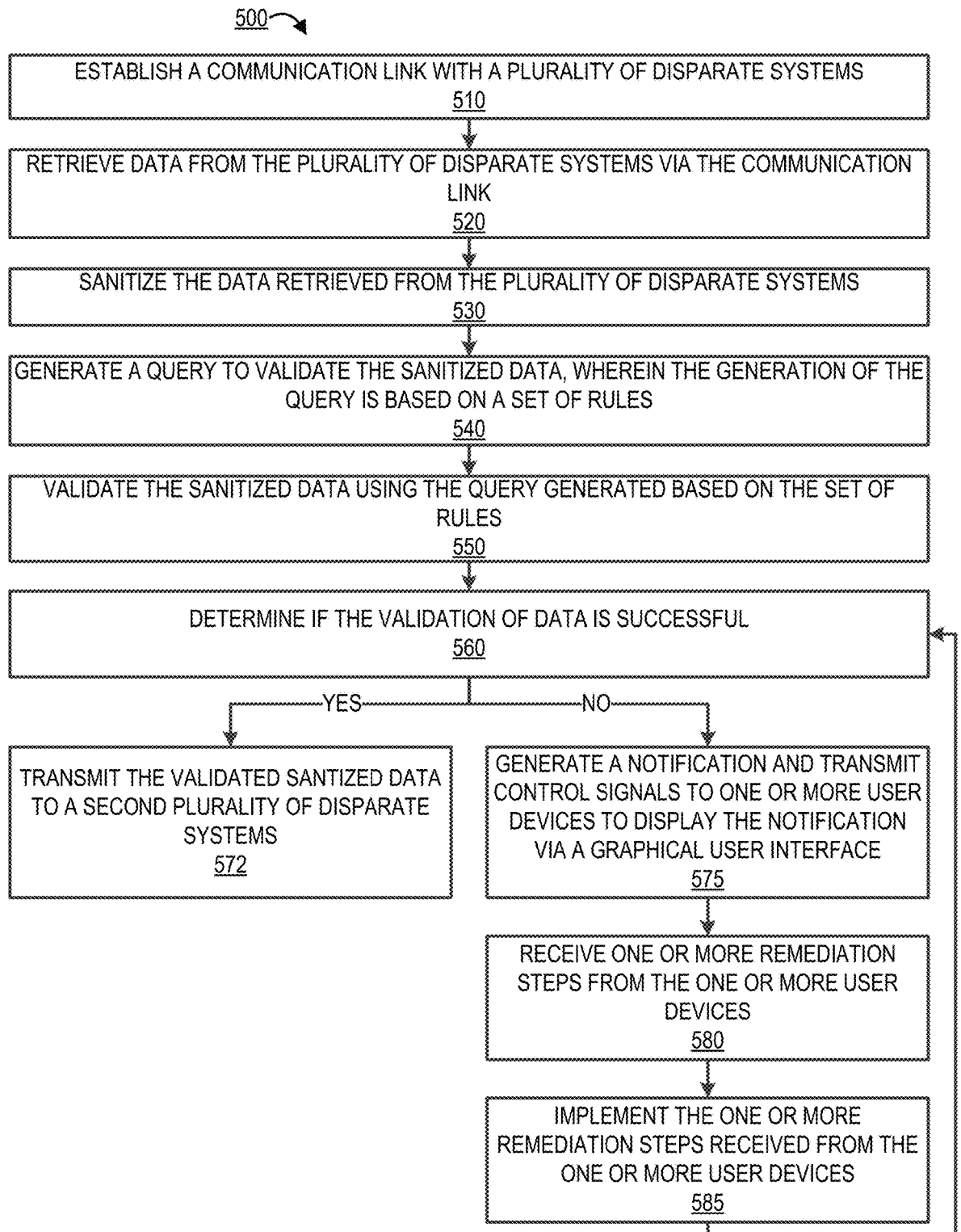

Having thus described embodiments of the invention in general terms, reference will now be made the accompanying drawings, wherein:

FIG. 1 provides a block diagram illustrating a system environment for providing validated sanitized data for application development, in accordance with an embodiment of the invention;

FIG. 2 provides a block diagram illustrating the entity system 200 of FIG. 1, in accordance with an embodiment of the invention;

FIG. 3 provides a block diagram illustrating a data provisioning system 300 of FIG. 1, in accordance with an embodiment of the invention;

FIG. 4 provides a block diagram illustrating the computing device system 400 of FIG. 1, in accordance with an embodiment of the invention; and FIG. 5 provides a flowchart illustrating a process flow for providing validated sanitized data for application development, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "data" refers to data in files, documents, records, sheets, databases and the like that may be analyzed, processed, sanitized, validated and/or transferred. Data (e.g., a group of individual resources) may originally be identified, received, or otherwise obtained from a production environment. Data may comprise a plurality of elements (e.g., data points, data field entries, columned data, rowed data, and the like). Each element may comprise one or more characters (e.g., alphabetical characters, numeric characters, alphanumeric characters, punctuation characters, and the like).

Typically, during development of various application within an entity (e.g., financial institution, non-financial institution, or the like) the application is tested in a testing environment for various scenarios using real-time data before moving into the real-time environment. The real-time data which is used in testing environment is extracted from real-time environment such as production or staging environment systems and may contain sensitive information such as Non-Public Information, private data, confidential data, or the like. Present conventional systems do not have the capability to sanitize the data and to validate the data at an element level to verify whether the sensitive information within the data has been sanitized properly or not. Therefore, there is a need for a system to sanitize the real-time data and validate the sanitized data before moving it into the lower level environments such as testing environment. The system of the present invention sanitizes the data or extracts the already sanitized data and dynamically generates a query based on the type of information within each cell of data. The present system validates the sanitized data by executing the query and notifies a plurality of users about successful or unsuccessful validation.

FIG. 1 provides a block diagram illustrating a system environment 100 for providing validated sanitized data for application development, in accordance with an embodiment of the invention. As illustrated in FIG. 1, the environment 100 includes a data provisioning system 300, entity system 200, a plurality of disparate systems 220, a second plurality of disparate systems 230, a computing device system 400, and one or more third party systems 140. One or more users 110 may be included in the system environment 100, where the users 110 interact with the other entities of the system environment 100 via a user interface of the computing device system 400. In some embodiments, the user(s) 110 of the system environment 100 may be program testers, software testers, programmers, computer science engineers, developers, or other employees employed by, or contractors associated with, the entity system 200.

The entity system(s) 200 may be any system owned or otherwise controlled by an entity to support or perform one or more process steps described herein. The entity may be any organization which develops or manages applications. In some embodiments, the managing entity is a financial institution. The entity system(s) 200 may include the plurality of disparate systems 220 and the second plurality of disparate systems 230, or any other systems which are involved in application development or application management. In some embodiments, the plurality of disparate systems 220 may include a production environment system, or any real-time systems comprising live real-time data. In one example, the real-time data may include customer information, transaction information, or any other real-time information associated with an entity such as a financial institution. In some embodiments, the second plurality of disparate systems 230 may include testing environment systems or non-production environment systems which utilize data extracted from the production environment systems to test and assess various applications within an entity. The plurality of disparate systems 220 and the second plurality of disparate systems 230 may process or store data in various structured and unstructured formats followed by different database systems including, but not limited to, Database Management Systems (DBMS), Relational Database Management Systems (RDBMS), Apache Hive, Hadoop Distributed File System (HDFS), Hadoop MapReduce, Hadoop YARN, Hadoop Common, Hadoop SQOOP, Hadoop SPARK, Hadoop NDM, Hadoop SFTP, Hadoop Hive Tables, Hadoop Staging, and the like or the like.

The data provisioning system 300 is a system of the present invention for performing one or more process steps described herein. In some embodiments, the data provisioning system 300 may be an independent system. In some embodiments, the data provisioning system 300 may be a part of the entity system 200.

The data provisioning system 300, the entity system 200, the plurality of disparate systems 220, the second plurality of disparate systems 230, the computing device system 400, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

In general, the data provisioning system 300 is configured to communicate information or instructions with the entity system 200, the plurality of disparate systems 220, the second plurality of disparate systems 230, the computing device system 400, and/or the third party system 140 across the network 150.

In some embodiments, the data provisioning system 300 may receive, extract, or otherwise identify data from the plurality of disparate systems 220 (e.g., production environment systems) via the entity system 200. In other embodiments, the data provisioning system 300 may communicate with the plurality of disparate systems 220 to extract, receive, or otherwise identify data. In alternate embodiments, the data provisioning system 300 may transmit instructions or control signals to the entity system 200 to receive, extract and/or identify data from the plurality of disparate systems 220.

In some embodiments, the data provisioning system 300 may transmit data to the second plurality of disparate systems 230 (e.g., application testing environment systems)

via the entity system 200. In other embodiments, the data provisioning system 300 may communicate with the second plurality of disparate systems 230 to transmit data. In alternate embodiments, the data provisioning systems 200 may transmit instructions or control signals to the entity system 200 to transmit data to the second plurality of disparate systems 230.

In some embodiments, the data provisioning system 300 may be configured to identify or receive requirements of a second plurality of disparate systems 230 (e.g., application testing environment) from the computing device system 400 associated with the user 110, generate a provisioned set of processed and/or sanitized data that meet the requirements of the application testing environment based on data extracted from the plurality of disparate systems 220, and seed the provisioned set of data to the second plurality of disparate systems (e.g., application testing environment) associated with the computing device system 400.

The data provisioning system 300 may comprise a network of a plurality of servers that are configured to solve problems involving massive amounts of data or other resources and/or computations. The data provisioning system 200 is configurable to provide a software framework for distributed storage and processing of large amounts of resources by dividing the large amounts of resources into batches that are manageable by each of the plurality of servers that run in parallel to efficiently process the data. The data provisioning system 300 may be configurable by the computing device system 400 associated with the user 110, such that the data provisioning system 300 can be structured or designed to perform certain data processing actions that are desirable or necessary for converting data from production or staging environments to be usable in testing environments without disclosing any personal, financial, confidential, or other sensitive information that is present in the production or staging environments.

In this way, the data provisioning system 300 may communicate information or instructions with the entity system 200, the plurality of disparate systems 220, the second plurality is systems 230, the computing device system 400, and/or the third party system 140 across the network 150. For example, the data provisioning system may receive, via a graphical user interface provided by the data provisioning system 300 on the computing device system 400 of the user 110, instructions that are configured to process batches or blocks of resources (e.g., data) in particular ways (e.g., to identify sensitive data in the batches or blocks of resources, to sanitize the identified sensitive data, to validate the sanitized data, and the like).

The computing device system 400 may be a system owned or controlled by the entity of the entity system 200, the user 110, and/or a third party that specializes in providing, hosting, managing, or otherwise controlling workstations or other computing devices that interact with systems in the system environment 100. As such, the computing device system 400 may be a computing device of the user 110 (e.g., an application or program tester or other developer or tester of applications associated with the entity system 200). In general, the computing device system 400 communicates with the user 110 via a user interface of the computing device system 400, and in turn is configured to communicate information or instructions with the data provisioning system 300, entity system 200, the plurality of disparate systems 220, the second plurality of disparate systems 230, and/or the third party system 140 across the network 150.

For example, the computing device system 400 may receive user input from the user 110 (e.g., via a data provisioning tool provided by the data provisioning system 300 stored on the computing device system 400 and/or accessible by the user 110 via the computing device system 400) comprising testing environment requirements (e.g., desired or maximum data volumes and/or data types), and the computing device system 400 may be configured to transmit the testing environment requirements to the data provisioning system 300. Additionally or alternatively, the computing device system 400 may be configured to receive validated sanitized data from the data provisioning system 300 and apply the validated sanitized data to the second plurality of disparate systems 230 (e.g., application testing environment systems) that the user 110 can access and manipulate through interactions with the user interface of the computing device system 400.

The plurality of disparate systems 220 may comprise a plurality of databases, production environments, staging environments, disaster recovery environments, and the like, where data, information, and other resources that are used or identified in real-world applications are collected. Additionally, the individual databases and/or environments may be disparate and comprise data that are in different formats from each other. The data provisioning system 300 may be configured to aggregate, monitor, trawl, or otherwise collect data from each of the plurality of disparate systems 220 into a single database.

The third party system 140 may be any system that provides additional resources (e.g., data or other information from sources that are not directly related to the entity system 200), aides in the functionality of one or more systems in the system environment 100, provides (or compares) regulatory or business standards to data or other resources in the system environment 100, and/or the like.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a data provisioning application 250, a data extraction/transfer application 260, and data repository 270 which comprises at least back-up data 273 which comprises validated sanitized data 275 and real0time data 277. The computer-executable program code of the network server application 240, the data provisioning application 250, and the data extraction/transfer application 260 may instruct the processing device 220 to perform certain logic, data-extraction, and data-storing functions of the entity system 200 described herein, as well as communication functions of the entity system 200.

The network server application 240, the data provisioning application 250, and the data extraction/transfer application 260 are configured to store data in the data repository 270 or to use the data stored in the data repository 270 when communicating through the network communication interface 210 with the data provisioning system 300, the plurality of disparate systems 220, the second plurality of disparate systems 230, and/or the third party system 140 to perform one or more process steps described herein. In some embodiments, the entity system 200 may receive instructions from the data provisioning system 300 via the data provisioning application 250 to perform certain data extraction operations from the plurality of disparate systems 220. Upon receiving the instructions from the data provisioning system 300, the entity system 200 extracts data via the data extraction/transfer application 260. In some embodiments, the entity system 200 may receive instructions from the data provisioning system 300 via the data provisioning application 250 to perform certain data transfer operations to the second plurality of disparate systems 230. Upon receiving the instructions from the data provisioning system 300, the entity system 200 transfers data via the data extraction/transfer application 260.

FIG. 3 provides a block diagram illustrating the data provisioning system 300 in greater detail, in accordance with embodiments of the invention. As mentioned above, the data provisioning system 300 of FIG. 1 may comprise a plurality of server systems 300, which may comprise a physical server, a virtual server, or any other computing device that is specifically configured to perform the data processing functions described herein.

As illustrated in FIG. 3, in one embodiment of the invention, the data provisioning system 300 includes one or more processing devices 320 operatively coupled to a network communication interface 310 and a memory device 330. In certain embodiments, the data provisioning system 300 is operated by a first entity, such as a financial institution, while in other embodiments, the data provisioning system 300 is operated by an entity other than a financial institution. In some embodiments, each data provisioning system 300 is owned or operated by the entity of the entity system 200. In some embodiments, the data provisioning system 300 may be an independent system. In alternate embodiments, the data provisioning system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the data provisioning system 300 described herein. For example, in one embodiment of the data provisioning system 300, the memory device 330 includes, but is not limited to, a network server application 340, a data extraction application/transfer application 360, a data sanitization application 380 comprising a query generator 385, and a data repository 390 comprising real-time data 392, sanitized data 394, validated sanitized data 396, a rules database 398 or other data. The computer-executable program code of the network server application 340, the data extraction/transfer application 350, the sensitive data identification application 360, the data sanitization application 370, and the sanitize data validation application 380 comprising the query generator 385 may instruct the processing device 320 to perform certain logic, data-processing, and data-storing functions of the data provisioning system 300 described herein, as well as communication functions of the data provisioning system 300.

The network server application 340, the data extraction/transfer application 350, the sensitive data identification application 360, the data sanitization application 370, and the sanitize data validation application 380 comprising the query generator 385 are configured to invoke or use the real-time data 392, the sanitized data 394, validated sanitized data 396 or other data in the data repository 390 when communicating through the network communication interface 310 with the entity system 200, the plurality of disparate systems 220, the second plurality of disparate systems 230, the computing device system 400, and/or the third party system 140. In some embodiments, the network server application 340, the data extraction/transfer application 350, the sensitive data identification application 360, the data sanitization application 370, and the sanitize data validation application 380 comprising the query generator 385 may be a part of a single application.

In some embodiments, the data extraction/transfer application 350 and the network provisioning application 340 of the data provisioning system 300 may instruct the processing device 320 to extract real-time data from the plurality of disparate systems 220 and may store the real-time data 392 of the data repository 390. The sensitive data identification application 360 may identify sensitive information by scanning one or more elements in the extracted real-time data stored in the repository. Identification of the sensitive information is based on the data types and the information or characters in the one or more elements. In some embodiments, the sensitive data identification application 360 may include a data type identification application to identify datatypes of the one or more elements. The data sanitization application 370 may then obfuscate the identified sensitive information in the real-time data or perform other sanitization techniques on the real-time data extracted from the plurality of disparate systems 220. The sanitized data validation application 380 validates the sanitized data to determine that all of the sensitive information (e.g., Non-Public Information (NPI), confidential data, private data, or the like) within the real-time data is sanitized or protected based on generating a query. The sanitized data validation application 380 may further include a query generator 385 which generates a query based on a set of rules stored in the rules database, where the set of rules are different for different data types. After successfully validating the sanitized data, the data extraction/transfer application 350 and the network provisioning application 350 may instruct the processing device 320, via the network communication interface 310, to transfer the validated sanitized data to the computing device system 400 and transmit control signals to display the validated sanitized data on the computing device system 400 via a graphical user interface provided by the data provisioning system 300. Upon displaying the validated sanitized data, the user 110 may provide an instruction to the data provisioning system to transfer the validated sanitized data to the second plurality of disparate systems 230.

FIG. 4 provides a block diagram illustrating a computing device system 400 of FIG. 1 in more detail, in accordance with embodiments of the invention. In one embodiment of the invention, the computing device system 400 is a workstation of the user 110 (e.g., application developer, tester, or the like) that is an employee, contractor, or otherwise affiliated with the entity of the entity system 200. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, data provisioning application 421, entity application 424. These applications also typically instructions to a graphical user interface (GUI) on the display 430 that allows the user 110 to interact with the computing device system 400, the entity system 200, the plurality of disparate systems 220, the second plurality of disparate systems 230, the data provisioning system 300, and/or other devices or systems. The memory 420 of the computing device system 400 may comprise a Short Message Service (SMS) application 423 configured to send, receive, and store data, information, communications, alerts, and the like via the wireless telephone network 152. The data provisioning application 421 provided by the data provisioning system 300 and stored in the memory 420 allows the user 110 to interact with the data provisioning system to provide one or more instructions. The entity application 424 allows the user 110 to interact with the entity system 200, the plurality of disparate systems 220, and the second plurality of disparate systems 230 to perform one or more action like testing an application, developing an application, or the like.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow 500 for provisioning validated sanitized data for application development. As shown in block 510, the system establishes a communication link with a plurality of disparate systems. The plurality of disparate systems may include production environment systems, staging environment systems, or the like. The plurality of disparate systems may include data in different structured and unstructured formats associated with different database systems including, but not limited to, Database Management Systems (DBMS), Relational Database Management Systems (RDBMS), Apache Hive, Hadoop Distributed File System (HDFS), Hadoop MapReduce, Hadoop YARN, Hadoop Common, Hadoop SQOOP, Hadoop SPARK, Hadoop NDM, Hadoop SFTP, Hadoop Hive Tables, Hadoop Staging, and the like or the like. In one embodiment, the system may establish a direct communication link with the plurality of disparate systems. In alternate embodiment, the system may establish a communication link with the plurality of disparate systems via an entity system.

As shown in block 520, the system retrieves data from the plurality of disparate systems via the communication link. Data may include any data in files, directors, websites, databases, sheets, documents, tables, records, or the like. Data may comprise one or more elements, wherein the one or more elements are associated with multiple fields and multiple data types. The data retrieved from the plurality of disparate systems is real-time production data. In some embodiments, the data may include sensitive information such as Non-Public Information (NPI), confidential information, private information, or the like. In one example, the data may include customer legal name, social security number, home address, phone number, transaction data, or the like. The data retrieved from the plurality of disparate systems may include data in different formats. Irrespective of the format of the data, the system of the present invention has the ability to sanitize and validate the sanitized data without having a user to develop or manually write queries for each of the different formats of the data.

As shown in block 530, the system sanitizes the data retrieved from the plurality of disparate systems 530. Sanitization of data may be protection of sensitive information within the data. In some embodiments, the system extracts already sanitized data and initiates the process flow at block 530. In some embodiments, the system identifies the sensitive information within the data based on analyzing the information in each of the one or more elements and fields and/or based on determining the datatypes of the one or more elements and fields. For example, the system may identify that an element or a cell of data may be associated with integer data type and has ten number of characters and may determine that the information may in the cell is phone number. Similarly, the system may use other methods to identify sensitive information within a data file or database table retrieved from the plurality of disparate systems. In some embodiments, the sensitive information identification step and/or one or more profiling characterizing steps may be configured to capture, identify, or otherwise characterize certain elements include sensitive information in the same manner as those techniques described in U.S. patent application Ser. No. 16/035,345 entitled "System for Monitoring Lower Level Environment for Unsanitized Data," which is filed concurrently to this patent application.

The system after identifying the sensitive information within the data, may sanitize the data to protect the sensitive information. In some embodiments, the system may sanitize the data by scrambling the sensitive information. For example, the system may split up the sensitive information into various parts and place that information with other elements or objects, which makes the data unidentifiable. In some embodiments, the system may sanitize the data by replacing one or more characters of a particular element/field with a string of different characters. In some embodiments, the system may sanitize the data by obfuscating the sensitive information. In some embodiments, the system may sanitize the data by creating mock values and replacing certain fields/elements with those mock values. In some embodiments, the sanitization step configured to sanitize the data in the same manner as those techniques described in U.S. patent application Ser. No. 16/035,077 entitled "Holistic and Secure Resource Provisioning Gateway System," which is filed concurrently to this patent application.

As shown in block 540, the system generates a query to validate the sanitized data, wherein the generation of the query is based on a set of rules. The query is used by the system to validate that all the sensitive information in the data is sanitized. The system based on the metadata, identified datatypes, and type of information associated with the sensitive information within the retrieved data, searches and extracts the set of rules from a rules database to formulate the query. A set of rules exist for each datatype and each type of information. In some embodiments, the generated query may also a small query embedded within the query to verify that none of the data retrieved from the plurality of systems has been deleted. For example, if hundred records comprising five elements per record were retrieved from the plurality of disparate systems, the system may generate a second query which is embedded within the main query to verify that hundred records comprising five elements per record exist after sanitization of data.

As shown in block 550, the system validates the sanitized data using the query generated based on the set of rules. The system executes the query to validate the sanitized data. Next, as shown in block 560, the system determines if the validation of data is successful. For example, the system determines if the execution of the query resulted in an anomaly, where the query gives an output of number of records or elements having the anomaly and also displays the records or elements having the anomaly. In other words, the system may identify that the sensitive information within a record has not been sanitized and may display the record as an anomaly.

Upon determining that the validation of data is successful, the system proceeds to block 560, where the system automatically transmits the validated sanitized data to a second plurality of disparate systems. The system establishes a communication link with the second plurality of systems to transmit the validated sanitized data. The second plurality of disparate systems nay include any of the non-production environment systems including, but not limited to, a development environment system, System Integration Testing (SIT) environment system, User Acceptance Testing (UAT) environment system, Quality Assurance (QA) environment system, or the like. In some embodiments, the system may display the validated sanitized data to a plurality of users on one or more user devices via a graphical user interface provided by the system. In such an embodiment, the plurality of users may directly use or transfer the validated sanitized data to the second plurality of systems for testing or development purposes. In another such embodiment, the system may transfer the validated sanitized data to the second plurality of systems upon receiving instructions from the plurality of users.

Upon determining that the validation of data is not successful, the system proceeds to block 575, where the system generates a notification and transmits control signals to display the notification via a graphical user interface provided by the system. The notification may include details associated with the unsuccessful validation of the sanitized data. In some embodiments, the system automatically determines a list of users based on a type of application consuming the validated sanitized data. For example, the system may notify a manager, lead application developer, lead application tester, application development team, testing team, compliance team, governance team, or the like. In response to displaying the notification to the list of users, the system may receive one or more remediation steps from the one or more user devices as shown in block 580. For example, when the unsuccessful validation is a result of non-obfuscation of a record within the data, a user based on the information associated with the unsuccessful validation of the sanitized data may submit an additional program code to obfuscate the record.

As shown in block 585, the system may implement the one or more remediation steps received from the one or more user devices. Continuing with the previous example, the system may execute the additional program code to obfuscate the record. The system may then proceed to step described in block 560 and continues to implement the steps between block 560 through block 585 until the validation of sanitized data is successful. In one example embodiment, a user may submit that the type of error is common and may instruct the system to ignore the type of error and proceed with the transfer of data to the second plurality of disparate systems. In some embodiments, the system in response to determining that the validation is not successful, may automatically implement one or more remediation steps. For example, the system may extract the one or more remediation steps based on historical data stored in a database.

In some embodiments, the process 500 may be initiated by the system when the system receives an input from a user computing device of a user. The input may include the type of real-time data needed for testing or development, type of testing environment system, type of production system from which the data is to be extracted, or the like. In some embodiments, the system may perform the process flow automatically and continuously for each of the multiple applications, multiple testing environments systems, multiple production environment systems, or multiple users, store the validated sanitized data for each of the above mentioned combinations of systems, application/users in a repository, and may present it to a user when the user requests for testing data associated with an application. The process of validation of sanitized data described herein may be applied to any kind of data, application, or any entity As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 8484US1.014033.3240 | 16/035,064 | INTEGRATED DATA PROVISIONING SYSTEM FOR APPLICATION DEVELOPMENT | Jul. 13, 2018 |
| 8485US1.014033.3241 | 16/035,077 | HOLISTIC AND SECURE RESOURCE PROVISIONING GATEWAY SYSTEM | Jul. 13, 2018 |
| 8487US1.014033.3242 | 16/035,114 | MONITORING DATA CONSUMPTION IN AN APPLICATION TESTING ENVIRONMENT | Jul. 13, 2018 |
| 8488US1.014033.3243 | 16/035,345 | SYSTEM FOR MONITORING LOWER LEVEL ENVIRONMENT FOR UNSANITIZED DATA | Jul. 13, 2018 |

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system,

The invention claimed is:

1. A system for provisioning validated sanitized data, the system comprising:
   at least one non-transitory storage device; and
   at least one processing device coupled to the at least one non-transitory storage device, wherein the at least one processing device is configured to:
   establish a communication link with a plurality of disparate systems;
   retrieve data from the plurality of disparate systems via the communication link, wherein the data in the plurality of disparate systems is a combination of structured data and unstructured data;
   sanitize the data retrieved from the plurality of disparate systems by obfuscating at least one of Non- Public Information (NPI), confidential data, and private data from the data retrieved from the plurality of disparate systems;
extract a set of rules from a rule database based on metadata associated with the data, type of information in the data, and data types associated with the data;
generate a query to validate the sanitized data, wherein the generation of the query is based on the set of rules that are formulated based on the metadata, the type of information, and the datatypes associated with the data, wherein the query comprises a second query embedded within the query, wherein the second query verifies that no part of the data has been deleted while sanitizing the data; and
validate the sanitized data using the query generated based on the set of rules.

2. The system of claim 1, wherein the at least one processing device is configured to:
determine that the validation of data is successful;
in response to determining that the validation of sanitized data is successful, transmit the sanitized data to a second plurality of disparate systems, wherein the second plurality of disparate systems are non-production environment systems.

3. The system of claim 1, wherein the at least one processing device is configured to:
determine that the validation of data is not successful;
in response to determining that the validation of sanitized data is not successful, generate an alert and transmit control signals to display the alert via a graphical user interface on one or more user devices.

4. The system of claim 3, wherein the at least one processing device is configured to:
in response to transmitting the control signals to display the alert, receive at least one remediation step from the one or more user devices, wherein the at least one remediation step is associated with the sanitized data;
implement the at least one remediation step received from the one or more user devices;
validate the sanitized data based on implementing the at least one remediation step; and
transmit the sanitized data to a second plurality of disparate systems, wherein the second plurality of disparate systems are non-production environment systems.

5. The system of claim 1, wherein the generation of the query extracting the set of rules from the rules database further comprises:
identifying the data types associated with one or more elements in the data;
scanning the one or more elements in the data; and
determining the type of information in the one or more elements based on scanning the one or more elements in the data and the identified data types.

6. The system of claim 1, wherein validating the sanitized data using the query comprises determining that the Non-Public Information (NPI), the confidential data, and the private data within the sanitized data is protected.

7. The system of claim 1, wherein the plurality of disparate systems comprise production environment systems.

8. A computer program product for providing validated sanitized data for application development, the computer program product comprising a non-transitory computer-readable storage medium having computer-executable instructions for causing a computer processor to perform the steps of:

establishing a communication link with a plurality of disparate systems;
retrieving data from the plurality of disparate systems via the communication link, wherein the data in the plurality of disparate systems is a combination of structured data and unstructured data;
sanitizing the data retrieved from the plurality of disparate systems by obfuscating at least one of Non-Public Information (NPI), confidential data, and private data from the data retrieved from the plurality of disparate systems;
extracting a set of rules from a rules database based on metadata associated with the data, type of information in the data, and datatypes associated with the data;
generating a query to validate the sanitized data, wherein the generation of the query is based on the set of rules that are formulated based on the metadata, the type of information, and the datatypes associated with the data, wherein the query comprises a second query embedded within the query, wherein the second query verifies that no part of the data has been deleted while sanitizing the data; and
validating the sanitized data using the query generated based on the set of rules.

9. The computer program product of claim 8, wherein the computer-executable instructions further cause the computer processor to perform the steps of:
determining that the validation of data is successful;
in response to determining that the validation of sanitized data is successful, transmitting the sanitized data to a second plurality of disparate systems, wherein the second plurality of disparate systems are non-production environment systems.

10. The computer program product of claim 8, wherein the computer-executable instructions further cause the computer processor to perform the steps of:
determining that the validation of data is not successful; and
in response to determining that the validation of sanitized data is not successful, generating an alert and transmit control signals to display the alert via a graphical user interface on one or more user devices.

11. The computer program product of claim 10, wherein the computer-executable instructions further cause the computer processor to perform the steps of:
in response to transmitting the control signals to display the alert, receiving at least one remediation step from the one or more user devices, wherein the at least one remediation step is associated with the sanitized data;
implementing the at least one remediation step received from the one or more user devices;
validating the sanitized data based on implementing the at least one remediation step; and
transmitting the sanitized data to a second plurality of disparate systems, wherein the second plurality of disparate systems are non-production environment systems.

12. The computer program product of claim 8, wherein the computer-executable instructions further cause the computer processor to perform the step of extraction the set of rules from the rules database based on:
identifying the data types associated with one or more elements in the data;
scanning the one or more elements in the data; and
determining the type of information in the one or more elements based on scanning the one or more elements in the data and the identified data types.

13. The computer program product of claim 8, wherein the computer-executable instructions further cause the computer processor to perform the step of validating the sanitized data by determining that the Non-Public Information (NPI), the confidential data, and the private data within the sanitized data is protected.

14. A computerized method for providing validated sanitized data for application development, the method comprising:
- establishing a communication link with a plurality of disparate systems;
- retrieving data from the plurality of disparate systems via the communication link, wherein the data in the plurality of disparate systems is a combination of structured data and unstructured data;
- sanitizing the data retrieved from the plurality of disparate systems by obfuscating at least one of Non-Public Information (NPI), confidential data, and private data from the data retrieved from the plurality of disparate systems;
- extracting a set of rules from a rules database based on metadata associated with the data, type of information in the data, and datatypes associated with the data;
- generating a query to validate the sanitized data, wherein the generation of the query is based on the set of rules that are formulated based on the metadata, the type of information, and the datatypes associated with the data, wherein the query comprises a second query embedded within the query, wherein the second query verifies that no part of the data has been deleted while sanitizing the data; and
- validating the sanitized data using the query generated based on the set of rules.

15. The computerized method of claim 14, wherein the method further comprises:
- determining that the validation of data is successful; and
- in response to determining that the validation of sanitized data is successful, transmitting the sanitized data to a second plurality of disparate systems, wherein the second plurality of disparate systems are non-production environment systems.

16. The computerized method of claim 15, wherein the method further comprises:
- determining that the validation of data is not successful; and
- in response to determining that the validation of sanitized data is not successful, generating an alert and transmit control signals to display the alert via a graphical user interface on one or more user devices.

17. The computerized method of claim 16, wherein the method further comprises:
- in response to transmitting the control signals to display the alert, receiving at least one remediation step from the one or more user devices, wherein the at least one remediation step is associated with the sanitized data;
- implementing the at least one remediation step received from the one or more user devices;
- validating the sanitized data based on implementing the at least one remediation step; and
- transmitting the sanitized data to a second plurality of disparate systems, wherein the second plurality of disparate systems are non-production environment systems.

18. The computerized method of claim 15, wherein the method further comprises validating the sanitized data by determining that the Non-Public Information (NPI), the confidential data, and the private data within the sanitized data is protected.

19. The computerized method of claim 14, wherein extracting the set of rules from the rules database further comprises:
- identifying the data types associated with one or more elements in the data;
- scanning the one or more elements in the data; and
- determining the type of information in the one or more elements based on scanning the one or more elements in the data and the identified data types.

20. The computerized method of claim 14, wherein the plurality of disparate systems comprise production environment systems.

* * * * *